(12) United States Patent
Chang et al.

(10) Patent No.: US 10,481,540 B2
(45) Date of Patent: Nov. 19, 2019

(54) SCANNER COVER

(71) Applicant: KINPO ELECTRONICS, INC., New Taipei (TW)

(72) Inventors: Tzu-Cheng Chang, New Taipei (TW); Shih-His Chiang, New Taipei (TW); Hung-Huan Sung, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 121 days.

(21) Appl. No.: 15/628,644

(22) Filed: Jun. 21, 2017

(65) Prior Publication Data
US 2018/0307173 A1 Oct. 25, 2018

(30) Foreign Application Priority Data
Apr. 20, 2017 (TW) .............................. 106205485 U

(51) Int. Cl.
*G03G 15/00* (2006.01)
*G03B 27/62* (2006.01)
*H04N 1/10* (2006.01)

(52) U.S. Cl.
CPC ....... *G03G 15/605* (2013.01); *G03B 27/6228* (2013.01); *H04N 1/1061* (2013.01); *H04N 2201/0422* (2013.01)

(58) Field of Classification Search
CPC ............. G03G 15/605; G03B 27/6228; H04N 1/1061; H04N 2201/0422
See application file for complete search history.

(56) References Cited

U.S. PATENT DOCUMENTS

| | | | |
|---|---|---|---|
| 6,405,017 B1* | 6/2002 | Takahashi | G03B 27/62 355/75 |
| 6,408,162 B1* | 6/2002 | Sheng | G03G 15/605 399/380 |
| 6,697,600 B2* | 2/2004 | Nishikino | G03G 15/605 399/380 |
| 7,342,692 B2* | 3/2008 | Chang | H04N 1/031 250/208.1 |
| 8,035,869 B2* | 10/2011 | Osakabe | H04N 1/00559 358/471 |
| 2005/0152008 A1* | 7/2005 | Seo | H04N 1/00519 358/474 |
| 2010/0142799 A1* | 6/2010 | Minamide | H05K 13/0813 382/145 |
| 2018/0249033 A1* | 8/2018 | Kjær Olsen | H04N 1/1013 |

* cited by examiner

*Primary Examiner* — David H Banh
(74) *Attorney, Agent, or Firm* — Chun-Ming Shih; HDLS IPR Services

(57) ABSTRACT

A scanner cover including a first plate and a second plate is provided. The first plate has a first surface; multiple compressible and deformable elastic structures are arranged protruding on the first surface. The second plate is stacked on the first plate and the second plate has a second surface facing to the first surface, the elastic structures are contacted with the second surface, and deformation of each elastic structure is contained in the second plate while the elastic structures are compressed. While the first plate and the second plate are pressed to move close to each other, the elastic structures are compressed and a restoring force is thereby provided between the first plate and the second plate.

12 Claims, 5 Drawing Sheets

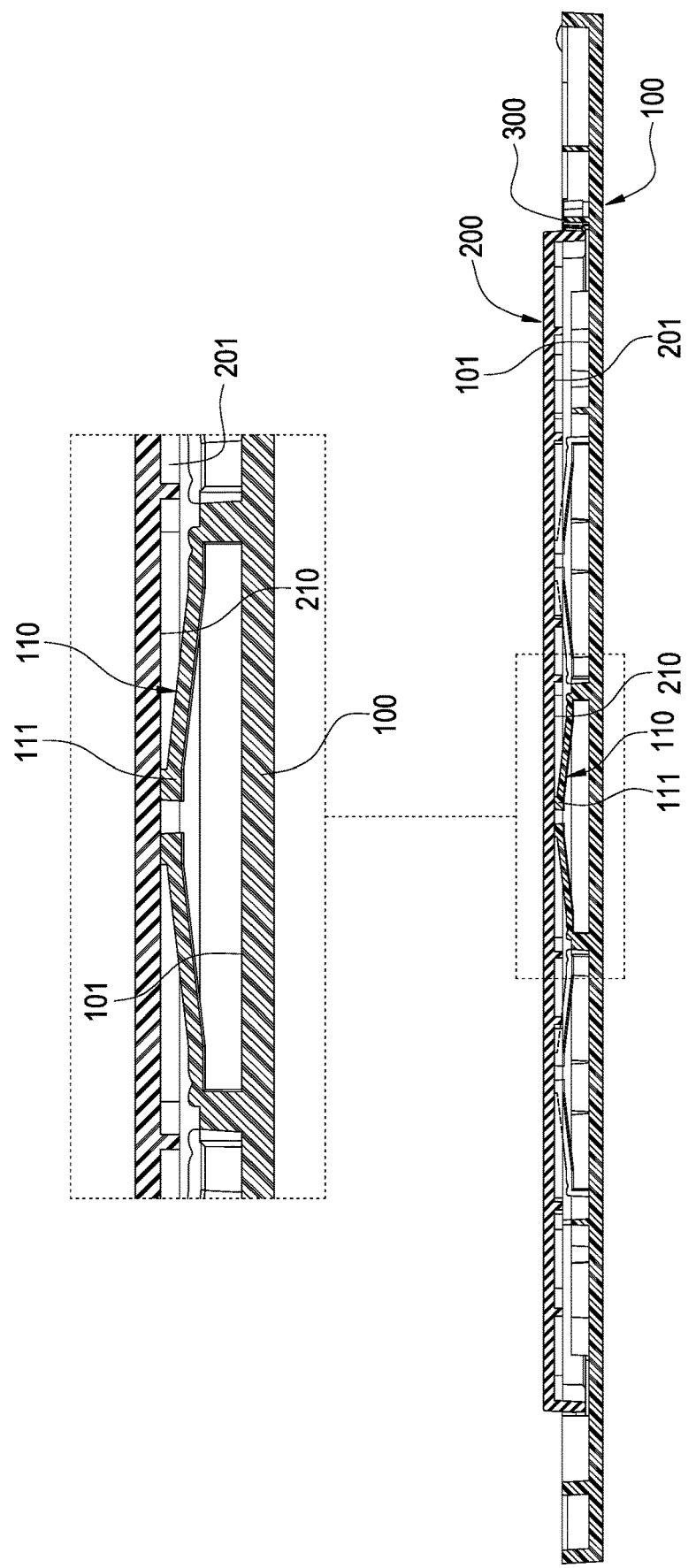

SCANNER COVER

BACKGROUND OF THE INVENTION

Technical Field

The present disclosure relates to parts of scanner, in particular to a self-push scanner cover.

Description of Related Art

A top cover is arranged on a conventional scanner, a pressing plate is arranged on an internal side of the top cover, and a sponge pad is stacked between the pressing plate and the top cover. While scanning a document, the document is pressed on the scanner by the top cover to fit the scanner. A user presses the top cover by hand to provide a point force, the document cannot be uniformly pressed and the sponge pad and the pressing plate are therefore used for providing uniform press at each location on the document to press the document.

The pressing plate and the sponge pad have to be manually assembled onto the top cover, a surface of the sponge pad is pasted on the internal side of the top cover in advance and the pressing plate is then pasted on the other surface of the sponge pad. The assembly process includes complex steps such as removing release liners and pasting, and therefore cannot be automatically operated.

In views of this, in order to solve the above disadvantage, the present inventor studied related technology and provided a reasonable and effective solution in the present disclosure.

SUMMARY OF THE INVENTION

A self-push scanner cover is provided in the present disclosure.

A scanner cover including a first plate and a second plate is provided in the present disclosure. The first plate includes a first surface, and a plurality of compressible and deformable elastic structure is arranged protruding on the first surface. The second plate is stacked on the first plate, the second plate has a second surface facing to the first surface, the elastic structures are respectively contacted with the second surface, and deformations of respective elastic structures are contained in the second plate while the elastic structures are compressed. While the first plate and the second plate are pressed to move close to each other, the elastic structures are compressed and a restoring force is thereby provided between the first plate and the second plate.

According to the scanner cover of the present disclosure, each elastic structure includes at least a pressing arm. Each elastic structure includes a couple of pressing arm extending toward each other. A limiting slot is defined on the second surface corresponding to each elastic structure, each elastic structure is contained in the corresponding limiting slot and the deformation of each elastic structure is contained in the corresponding limiting slot while the elastic structure is compressed, each pressing arm extends from the first surface into the corresponding limiting slot.

According to the scanner cover of the present disclosure, a first latch is arranged on the first plate, and a second latch correspondingly engaged with the first latch is arranged on the second plate. An action region extending along a normal direction of the first surface is defined at the first latch, and when the first plate and the second plate are moved related to each other, the second latch is allowed to move in the action region. Alternatively, an action region extending along a normal direction of the second surface is defined at the second latch, and when the first plate and the second plate are moved related to each other, the first latch is allowed to move in the action region.

According to the scanner cover of the present disclosure, a frame for containing the second plate is arranged on the first surface, and a yielding structure is arranged at an edge of the frame, the yielding structure is elastically deformable, each first latch is thereby allowed to sidestep the corresponding second latch and the second plate is therefore allowed to move into the frame. A frame for containing the first plate is arranged on the second surface, and a yielding structure is arranged at an edge of the frame, the yielding structure is elastically deformable, each second latch is thereby allowed to sidestep the corresponding first latch and the first plate is therefore allowed to move into the frame.

A pivot base is arranged at an edge of the first plate. A pivot base is arranged at an edge of the second plate. The pivot base is pivotally connected with a scanner, and the scanner cover is rotatable about the pivot base to press on the scanner. The pivot base is pivotally connected with a scanner, and the scanner cover is rotatable about the pivot base to press on the scanner.

BRIEF DESCRIPTION OF DRAWING

The present disclosure can be more fully understood by reading the following detailed description of the embodiment, with reference made to the accompanying drawings as follows:

FIG. 5 is a cress sectional view showing the scanner cover of the embodiment of the present disclosure.

DETAILED DESCRIPTION

Figure 1:
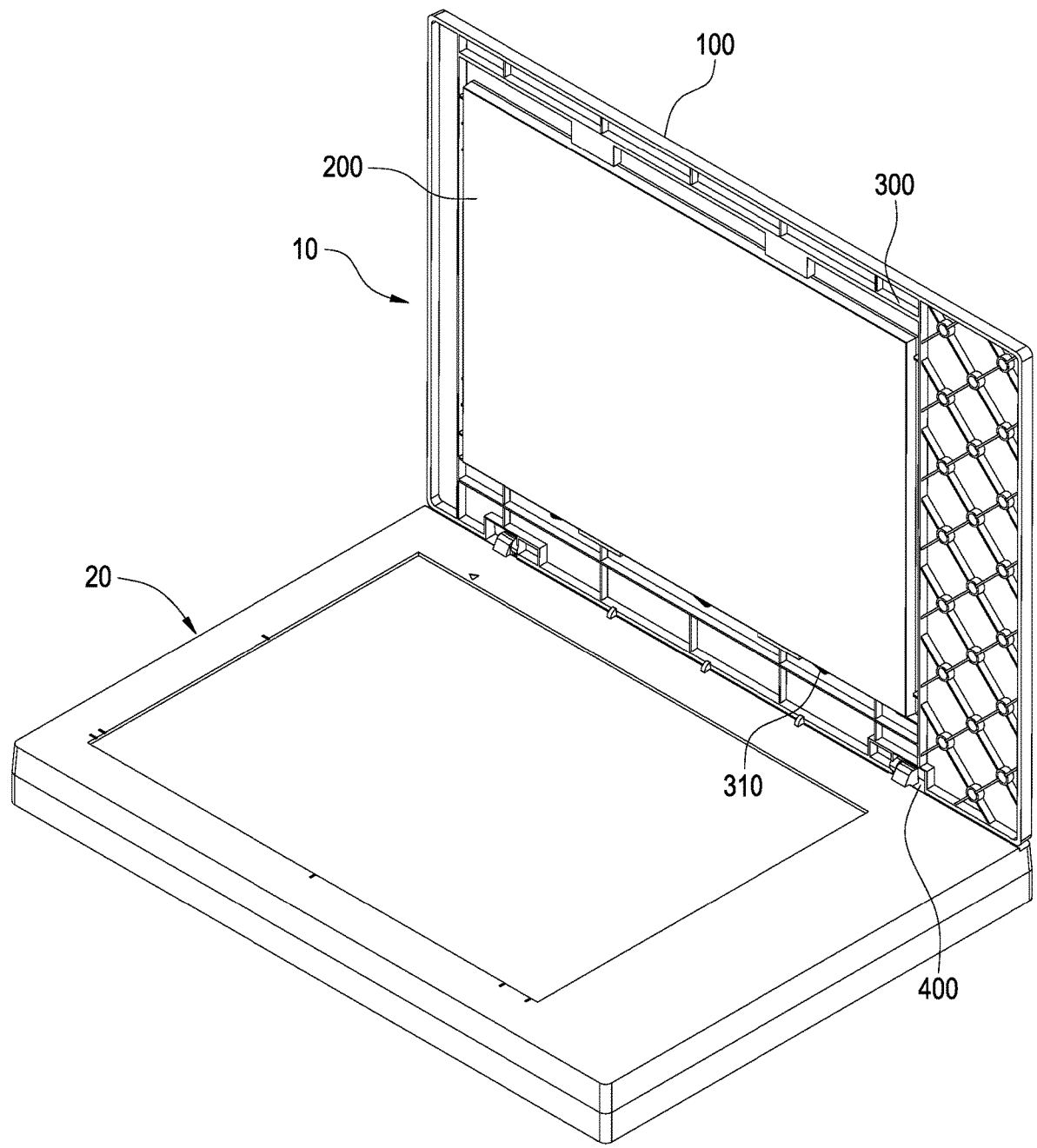
FIG. 1 is a perspective view showing the scanner cover of the embodiment of the present disclosure.
Figure 2:
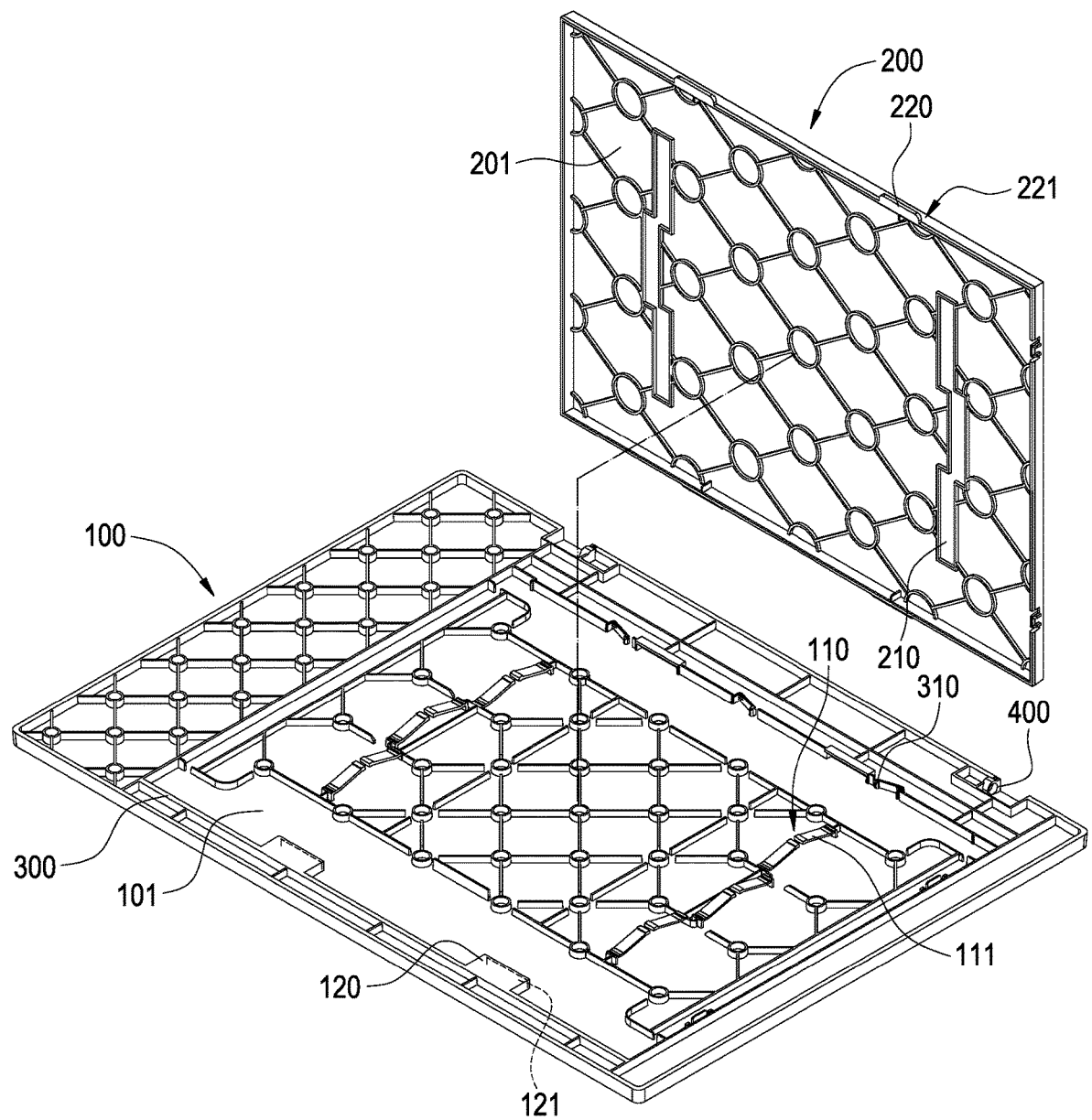
FIGS. 2 and 3 are exploded views showing the scanner cover of the embodiment of the present disclosure.
Figure 3:
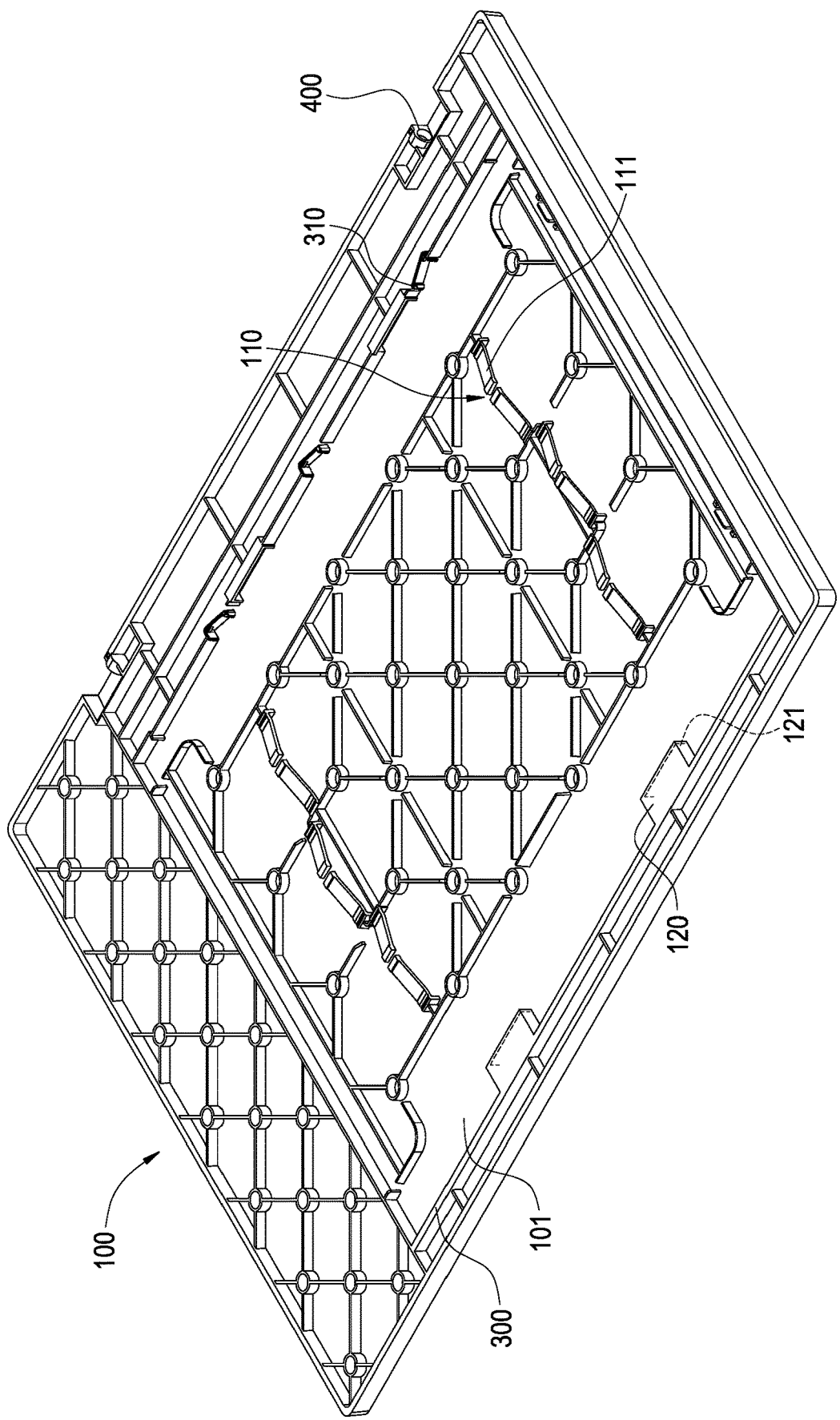
Figure 4:
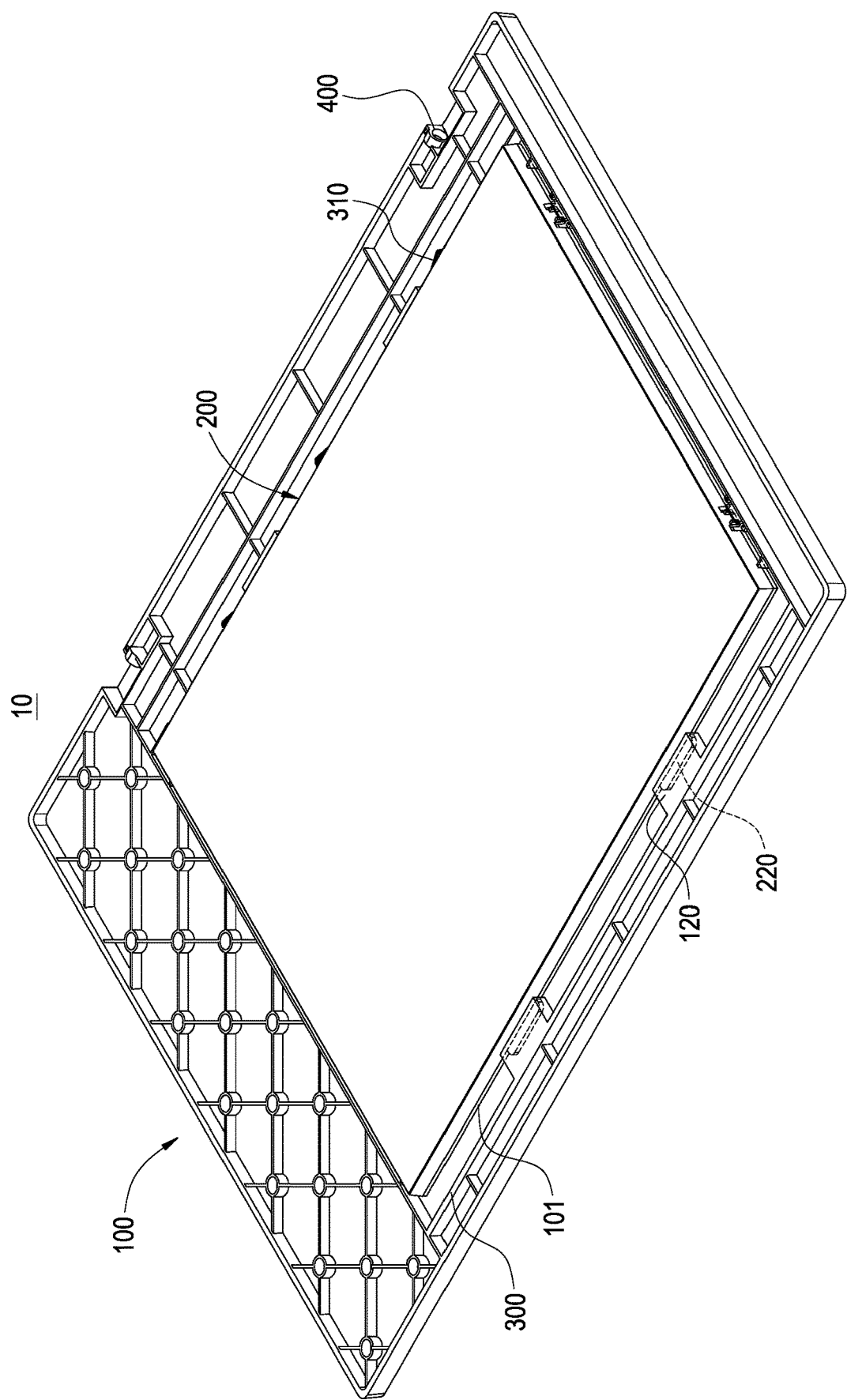
FIG. 4 is another perspective view showing the scanner cover of the embodiment of the present disclosure.

According to FIGS. 1 to 5, a scanner cover 10 pivotally arranged on a scanner 20 is provided in the embodiment of the present disclosure, and the scanner cover 10 of the present disclosure is thereby rotatable about the pivot base 400 to press on the scanner 20. The scanner cover 10 of the present disclosure is used to press a scanned document on the scanner 20, and the scanned document is thereby fit the scanner 20. The scanner cover 10 of the present disclosure includes at least a first plate 100 and a second plate 200, first plate 100 is used for an external cover according to the present embodiment and the second plate 200 is used for a pressing plate, and the pressing plate is directly contacted with the scanned document to press the scanned document.

The first plate 100 has a first surface 101, a plurality of compressible and deformable elastic structures 110 are arranged protruding on the first surface 101. In the present embodiment, each elastic structure 110 includes at least a pressing arm 111 of an arm shape, the elastic structure 110 preferably includes a couple of pressing arms 111 the same as each other in structure and function, and the couple of pressing arms 111 are arranged extending toward each other. However, the elastic structure 110 of the present disclosure should not be limited to the embodiment, is could be various compressible and deformable structures. A frame 300 for containing the second plate 200 is preferably formed on the first surface 101, and at least an elastically deformable yielding structure 310 is arranged at an edge of the frame 300, in the present embodiment, the yielding structure 310 is preferably of an arm shape and inward extending from the frame 300, but scope of the present disclosure should not be limited to the embodiment. A first latch 120 is arranged on the first plate 100, in the present embodiment, the first latch 120 preferably is preferably a protruding tab inward extending from a side of the frame 300, the first latch 120 and the first surface 101 are arranged at interval and an action region 221 extending along a normal direction of the first surface 101 is thereby defined between the first latch 120 and the first surface 101.

The second plate 200 is stacked on the first surface 101 of the first plate 100, and the second plate 200 has a second surface 201 facing to the first surface 101, each elastic structure 110 is contacted with the second surface 201, and each elastic structure is contained in the second plate 200 while the elastic structures 110 are compressed, structures thereof are described below in detail. A limiting slot 210 is defined on the second surface 201 corresponding to respective elastic structures 110, each elastic structure 110 is contained in the corresponding limiting slot 210, preferably, each pressing arm 111 extends from the first surface 101 into the corresponding limiting slot 210. And, while the elastic structures 110 are compressed, the deformation of each elastic structures 110 is contained in the corresponding limiting slot 210. A second latch 220 for engaging with the corresponding first latch 120 is arranged on the second plate 200. In the present embodiment, the second latch 220 is preferably a protruding tab out ward extending from a side of the second plate 200, while the first plate 100 and the second plate 200 are moved related to each other, the second latch 220 is allowed to move in the action region 121 of the first latch 120. Moreover, another action region 221 extending along a normal direction of the second surface 201 could be alternatively defined at the second latch 220, while the first plate 100 and the second plate 200 are moved related to each other, the first latch 120 is allowed to move in the action region 221 of the second latch 220.

In the present embodiment, the yielding structure 310 is elastically deformable and each first latch 120 is thereby allowed to sidestep the corresponding second latch 220, and the second plate 200 is therefore allowed to move into the frame 300. However, the scope of the present disclosure should not be limited to the embodiment, the second plate 200 could alternatively be used for a top cover and the first plate 100 could be used for a pressing plate, the frame 300 could be formed on the second surface 201 for containing the first plate 100, and a yielding structure 310 is arranged at an edge of the frame 300, the yielding structure 310 is elastically deformable and each first latch 120 is thereby allowed to sidestep the corresponding second latch 220, and the first plate 100 is therefore allowed to move into the frame 300.

In the present embodiment, a pivot base 400 is preferably arranged at an edge of the first plate 100. The pivot base 400 is pivoted with the scanner 20, and the scanner cover 10 of the present disclosure is thereby rotatable about the pivot base 400 to press on the scanner 20 or leave from the scanner 20, but the scope of the present disclosure should not be limited to the embodiment. For example, the pivot base 400 could be alternatively arranged at an edge of the second plate 200.

While the scanned document is pressed on the scanner 20 by the, the first plate 100 and the second plate 200 are pressed to move close to each other. Meanwhile, each elastic structure 110 is compressed and a restoring force for pressing the scanned to fit the scanner 20 is thereby provided between the first plate 100 and the second plate 200.

According to the scanner cover 10 of the present disclosure, the conventional sponge pad is replaced by the elastic structure 110 to providing a pressure, the elastic structure 110 can be formed while the on the first plate 100 while forming the first plate 100, and the second plate 200 is assembled onto the first plate 100. Accordingly, the present disclosure includes parts less than conventional technology, assemble steps thereof are reduced, the structure is able to be automatically assembled, and manufacture cost of the present disclosure is therefore significantly reduced.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A scanner cover, comprising:
   a first plate, the first plate comprising a first surface, a plurality of compressible and deformable elastic structures being integrally formed on the first surface; and
   a second plate, the second plate being stacked on the first plate and having a second surface facing to the first surface, the elastic structures being contacted with the second surface, and deformation of respective elastic structures being contained in the second plate while the elastic structures being compressed;
   wherein while the first plate and the second plate are pressed to move close to each other, the elastic structures are compressed and a restoring force is thereby provided between the first plate and the second plate;
   wherein each elastic structure is formed on the plate while forming the first plate and comprises a couple of pressing arms extending toward each other.

2. The scanner cover according to claim 1, wherein a limiting slot is defined on the second surface corresponding to each elastic structure, each elastic structure is contained in the corresponding limiting slot and the deformation of each elastic structure is contained in the corresponding limiting slot while the elastic structure is compressed, and each pressing arm extends from the first surface into the corresponding limiting slot so as to be pressed to attach on the first surface or the second surface.

3. The scanner cover according to claim 1, wherein a limiting slot is defined on the second surface corresponding to each elastic structure, the elastic structures are respectively correspondingly contained in the limiting slots, and the deformation of each elastic structure is contained in the corresponding limiting slot while each of the elastic structures is compressed.

4. The scanner cover according to claim 1, wherein a first latch is arranged on the first plate, and a second latch correspondingly engaged with the first latch is arranged on the second plate.

5. The scanner cover according to claim 4, wherein an action region extending along a normal direction of the first surface is defined at the first latch, and when the first plate and the second plate are moved related to each other, the second latch is allowed to move in the action region.

6. The scanner cover according to claim 4, wherein an action region extending along a normal direction of the second surface is defined at the second latch, and when the first plate and the second plate move relative to each other, the first latch is allowed to move in the action region.

7. The scanner cover according to claim 4, wherein a frame for containing the second plate is arranged on the first surface, and a yielding structure is arranged at an edge of the frame, the yielding structure is elastically deformable, each first latch is thereby allowed to sidestep the corresponding second latch and the second plate is therefore allowed to move into the frame.

8. The scanner cover according to claim 4, wherein a frame for containing the first plate is arranged on the second surface, and a yielding structure is arranged at an edge of the frame, the yielding structure is elastically deformable, each second latch is thereby allowed to sidestep the corresponding first latch and the first plate is therefore allowed to move into the frame.

9. The scanner cover according to claim 1, wherein a pivot base is arranged at an edge of the first plate.

10. The scanner cover according to claim 1, wherein a pivot base is arranged at an edge of the second plate.

11. The scanner cover according to claim 9, wherein the pivot base is pivotally connected with a scanner, and the scanner cover is rotatable about the pivot base to press on the scanner.

12. The scanner cover according to claim 10, wherein the pivot base is pivotally connected with a scanner, and the scanner cover is rotatable about the pivot base to press on the scanner.

* * * * *